(12) United States Patent
Lindsay et al.

(10) Patent No.: US 8,396,022 B1
(45) Date of Patent: Mar. 12, 2013

(54) SOURCE ROUTING BANDWIDTH ACTIVATION

(75) Inventors: William Alan Lindsay, El Cerrito, CA (US); Lance R. Doherty, Berkeley, CA (US)

(73) Assignee: Dust Networks, Inc., Hayward, CA (US)

( * ) Notice: Subject to any disclaimer, the term of this patent is extended or adjusted under 35 U.S.C. 154(b) by 0 days.

(21) Appl. No.: 12/288,342

(22) Filed: Oct. 17, 2008

Related U.S. Application Data

(60) Provisional application No. 61/002,415, filed on Nov. 7, 2007.

(51) Int. Cl.
*H04B 7/212* (2006.01)
(52) U.S. Cl. ........ 370/321; 370/326; 370/329; 370/337; 370/347; 370/349; 370/392; 370/394; 370/395.31; 370/395.4; 370/436; 370/458; 370/478
(58) Field of Classification Search .................. 703/227; 370/338, 389, 390, 392, 395.4
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 7,414,977 | B2 * | 8/2008 | Orlik et al. | 370/238 |
| 2001/0032272 | A1 * | 10/2001 | Fujita | 709/241 |
| 2005/0111428 | A1 * | 5/2005 | Orlik et al. | 370/344 |
| 2005/0185632 | A1 * | 8/2005 | Draves et al. | 370/351 |
| 2005/0190796 | A1 * | 9/2005 | Date et al. | 370/503 |
| 2005/0213612 | A1 * | 9/2005 | Pister et al. | 370/503 |
| 2006/0198337 | A1 * | 9/2006 | Hoang et al. | 370/329 |
| 2006/0248197 | A1 * | 11/2006 | Evans et al. | 709/227 |
| 2009/0010205 | A1 * | 1/2009 | Pratt et al. | 370/328 |
| 2009/0046732 | A1 * | 2/2009 | Pratt et al. | 370/406 |
| 2009/0116472 | A1 * | 5/2009 | Chang et al. | 370/350 |

* cited by examiner

*Primary Examiner* — Bo Hui A Zhu
(74) *Attorney, Agent, or Firm* — McDermott Will & Emery LLP

(57) ABSTRACT

A method for processing a source routed packet comprises determining a next node in a source route for a source routed packet in a mesh network and transmitting the source routed packet to the next node in the source route. A method for creating a source routed packet comprises determining a source route path to a destination node and transmitting a source routed packet that includes the source route path to a first node associated with the source route path.

20 Claims, 11 Drawing Sheets

SR: A, C, E, F  *502*

500

Timeslot

| Ch. | 1 | 2 | 3 | 4 | 5 | 6 |
|---|---|---|---|---|---|---|
| 1 | F→E |  | F→E |  | F→E |  |
| 2 |  | E→C |  | E→C |  | E→C |
| 3 | C→A |  | C→A |  | C→A |  |

Fig. 5

SOURCE ROUTING BANDWIDTH ACTIVATION

CROSS REFERENCE TO OTHER APPLICATIONS

This application claims priority to U.S. Provisional Patent Application No. 61/002,415 entitled SOURCE ROUTING BANDWIDTH ACTIVATION filed Nov. 7, 2007 which is incorporated herein by reference for all purposes.

BACKGROUND OF THE INVENTION

Distributed sensor networks utilize a set of sensors performing measurements across time and space to gather information about their environment. The sensors typically use wireless communication (e.g., radio transmission) to send their measured data to a central computer system, which accumulates the data and builds it into a larger picture. In some sensor network systems, communication among sensor nodes is organized as a set of links, scheduled in time into a communications frame A communications scheme organized in this way saves power by minimizing the total time each node needs to have its transmitter and receiver powered on. Each frame can be designed for a different communication need (e.g., system startup, normal operation, node diagnostics, emergency purposes), and nodes can individually switch among frames as necessary or nodes can have multiple frames operating concurrently.

However, latency, or the time it takes a communication message to travel from one point to another in the network, can be very high in a system using a set of general-purpose communication frames. This may be due to the fact that a given pair of nodes may communicate very infrequently in a frame, only sending small packets of data in each link, causing communication, especially for large amounts of data, to take a very long time. Also, in some cases only a portion of a network or a portion of communication links of the network are desired to be used. For example, a frame defines communication links where for a given purpose only some of the communication links are desired to be used and the remaining links, if the frame is activated for the given purpose, would not be used and would waste power listening for messages.

BRIEF DESCRIPTION OF THE DRAWINGS

Various embodiments of the invention are disclosed in the following detailed description and the accompanying drawings.

FIG. 5 is a diagram illustrating an embodiment of a low latency frame on a mesh network.

DETAILED DESCRIPTION

Figure 1:
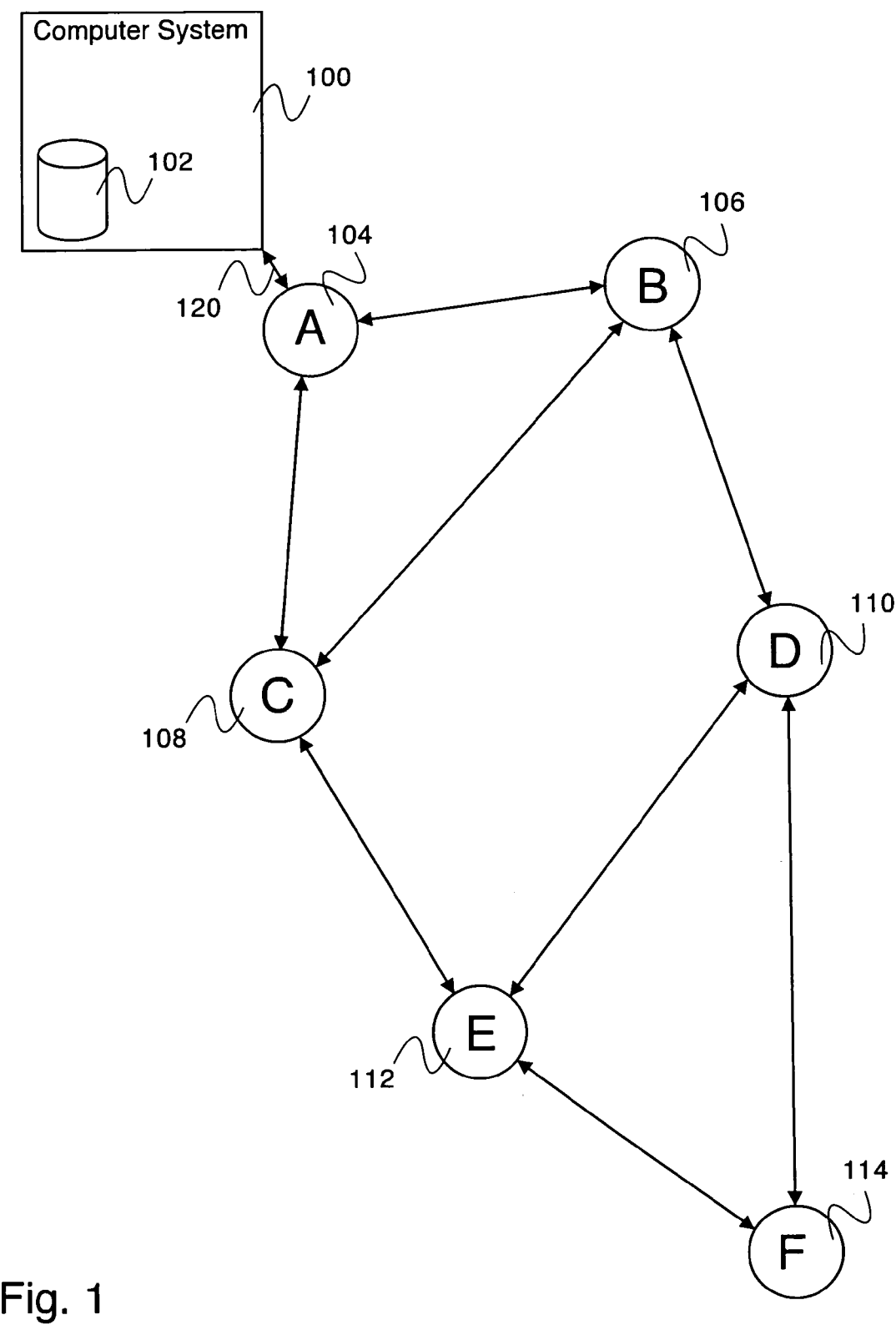
FIG. 1 is a block diagram illustrating an embodiment of a mesh network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Source routing bandwidth activation is disclosed. A data packet to be routed from one node to another node may be source routed, indicating it is transmitted with an ordered list of nodes through which it is to be forwarded. When a node receives a source routed data packet, it determines the next node in the source route, waits for the appropriate link in the frame, and then forwards the packet to the next node. When the data packet reaches the end of the source route, the final node transmits an acknowledgement back to the originating node, implicitly acknowledging that the packet has traversed the entire route successfully. Use of a source routed packet allows data included in the packet to be communicated to a specific subset of nodes, in a specific order. In addition, a frame that is used when source routing can be designed with a higher density of links than a general-purpose frame because when used in conjunction with source routing not all the links are activated. Therefore, the frame can be designed with links that would have collisions (e.g., two nodes transmitting to the same receiving node at the same time) because, if used appropriately with source routing, a collision would not occur as one of the two nodes would not be activated.

A source routed packet is used to command a predefined subset of communications nodes to switch to a predefined low latency frame for communication along that set of nodes. When it is desired to open a sustained low latency connection between the two nodes, a packet is source routed from the originating node to the final node, with instructions to switch on an appropriate frame on the nodes for source routing that is designed to achieve a low latency connection between the two nodes. In various embodiments, there is one, two, or many frames that are 'on' or active, or a portion of a frame, or any other appropriate combination of frames.

Sensor nodes can have multiple modes of transmission, including a low power and low bandwidth mode to be used for general-purpose communication and a high power/high bandwidth mode to be used when high data rate communication is necessary. A set of nodes can be instructed to switch to a low latency frame by a source routed packet, or be instructed to switch to high bandwidth mode, establishing a low latency and high bandwidth link between the nodes. In some embodiments, both frames are active concurrently.

In various embodiments, source routing a packet is used between two peer nodes, from a down stream node to an upstream node, from an upstream node to a down stream node, from a gateway node and a non-gateway node, from a non-gateway node to a gateway node, or any other appropriate combination of nodes.

In some embodiments, source routing a packet is used to activate a high bandwidth communication link—for example, during the setup of a mesh network a newly joined node requires setup or configuration information or during an alarm state a sensor node feeds back information to a actuator or switch node.

FIG. 1 is a block diagram illustrating an embodiment of a mesh network. In the example shown, the mesh network comprises node 104, node 106, node 108, node 110, node 112, node 114, and computer system 100. Computer system 100 communicates with gateway node 104 via connection 120. In various embodiments, connection 120 is a wired connection, a wireless connection, a local area network, a wide area network, the Internet, or any other appropriate network. In some embodiments, gateway node 104 is one of a plurality of gateway nodes. In some embodiments, computer system 100 is capable of processing data sent to it through the mesh network. Computer system 100 includes storage 102.

In the example shown, node 104 is linked to nodes 106 and 108. Node 106 is linked to node 104, node 108, and node 110. Node 108 is linked to node 104, node 106, and node 11. Node 110 is linked to node 106, node 110, and node 114. Node 112 is linked to node 108, node 110, and node 114. Node 114 is linked to node 112 and node 110. In some embodiments, the nodes communicate using radio frequencies that are in the 900-930 MHz or 2.45 GHz industrial, scientific, and medical (ISM) radio band. In some embodiments, the mesh network is compatible with IEEE standard 802.15.4. The IEEE 802.15.4 standard relates to low rate wireless personal area networks. In some embodiments, the ability of nodes to link is determined by their physical distance from one another.

Figure 2:
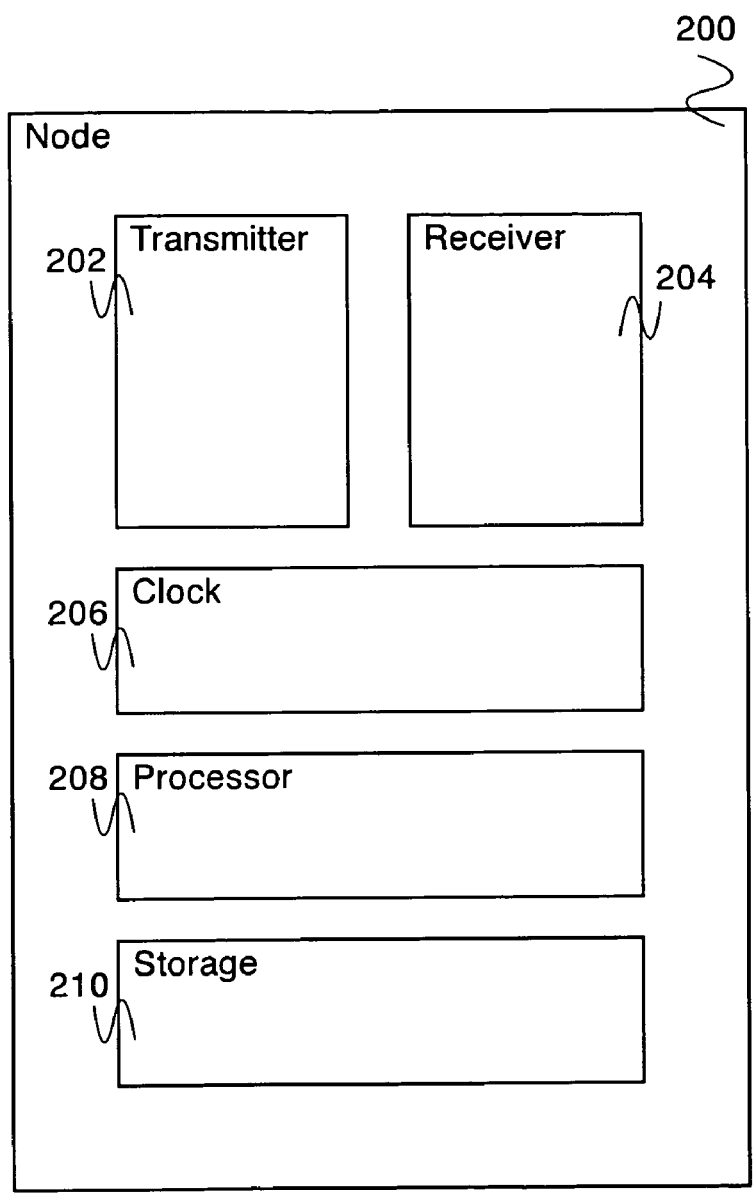
FIG. 2 is a block diagram illustrating an embodiment of a node.

FIG. 2 is a block diagram illustrating an embodiment of a node. In some embodiments, node 200 of FIG. 2 is part of a mesh network (e.g., node 104, node 106, node 108, node 110, node 112, and/or node 114 of the mesh network of FIG. 1). In the example shown, node 200 comprises transmitter 202, receiver 204, clock 206, processor 208, and storage 210. Transmitter 202 and receiver 204 enable node 200 to communicate with other nodes and/or with other systems that include transmitters and/or receivers. In various embodiments, transmitter 202 and/or receiver 204 communicate using frequency modulated signals, phase modulated signals, amplitude modulated signals, time division multiplexing signals, code division multiplexing signals, signals compliant with the Institute of Electrical and Electronics Engineers (IEEE) 802.11 standard, signals compliant with the Institute of Electrical and Electronics Engineers (IEEE) 802.15.4 standard, signals according to the Bluetooth protocol, signals according to the ultra wide bandwidth (UWB) approach, or signals encoded using any other appropriate scheme. In various embodiments, transmitter 202 and/or receiver 204 communicate in the medium frequency band, the high frequency band, the very high frequency band, the ultra high frequency band, or any other appropriate frequency band. In some embodiments, transmitter 202 and receiver 204 communicate using the industrial, scientific, and medical (ISM) bands (e.g., 902-928 MHz, 2.400-2.500 GHz, 5.725-5.875 GHz, etc.). In some embodiments, transmitter 202 and receiver 204 can switch between a low bandwidth/low power consumption mode and a high bandwidth/high power consumption mode, to enable low power use during normal operation but allow for high bandwidth transmission when necessary. In some embodiments, node 200 includes a battery and is designed to require infrequent battery replacement (e.g., a low power node that has a battery change once a month, once a few months, once a year, once every few years, etc. depending on the application). In some embodiments, node 200 includes systems designed to gather and store energy from the environment (e.g., light energy from the sun or other light energy sources, mechanical energy from vibration of the node, or any other appropriate environmental energy source).

Figure 3:
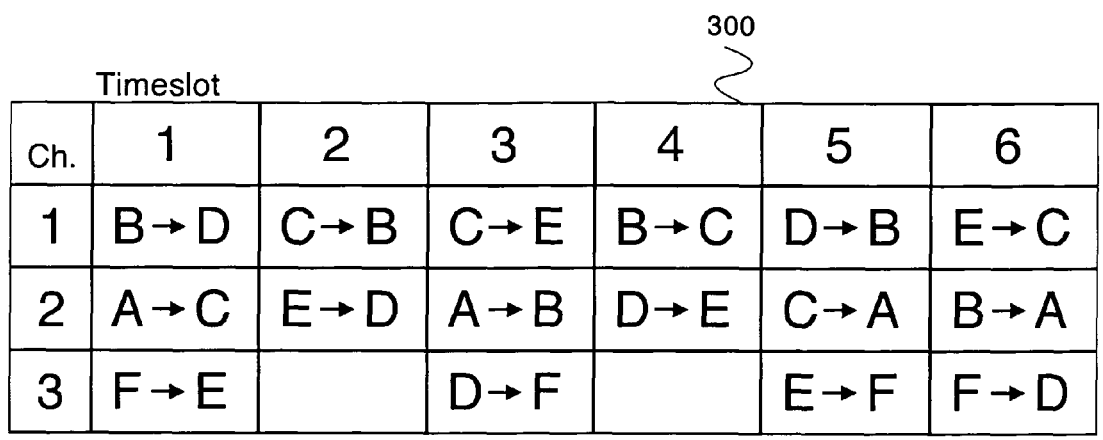
FIG. 3 is a diagram illustrating an embodiment of a communications frame for a time synchronized mesh network.

FIG. 3 is a diagram illustrating an embodiment of a communications frame for a time synchronized mesh network. Each hop in a time synchronized mesh network requires one or more pair-wise communication transactions between two devices. Time in a time synchronized mesh network is broken into synchronized units called "slots" which are long enough for one such transaction to occur. A global "schedule" coordinates all such communication in the network enabling different multi-hop routes to be taken from source to destination depending on the neighbor assignments. Each slot used for communication is called a "link" and a repeating series of links is called a "frame". In some embodiments, a frame comprises a plurality of sets of slots, corresponding to multiple links able to be activated at once on separate radio channels. Each set of slots is called a "channel". The position in a frame at a timeslot in a channel is called a "cell". In some embodiments, frame 300 comprises a communications schedule for the mesh network of FIG. 1. In the example shown, frame 300 comprises a series of six links and three channels. A given node may only transmit or receive on one channel at a time. Each cell may or may not be filled with one or more communication links. In various embodiments, there are multiple transmitters and/or receivers scheduled for the same cell—for example, there can be many transmitters and one receiver similar to Slotted Aloha for another example, there can be many receivers and one transmitter as in the case of a broadcast. The set of communication links in frame 300 allow any link in the mesh network of FIG. 1 to be activated in either direction for one time slot over the course of the cycle.

The set of communication links in FIG. 3 describes which node is transmitting and which node is listening on each communication channel in each timeslot. For timeslot 1 and channel 1, node B transmits to node D. For timeslot 1 and channel 2, node A transmits to node C. For timeslot 1 and channel 3, node F transmits to node E. For timeslot 2 and channel 1, node C transmits to node B. For timeslot 2 and channel 12, node E transmits to node D. For timeslot 2 and channel 3, no nodes are transmitting or listening. For timeslot 3 and channel 1, node C transmits to node E. For timeslot 3 and channel 2, node A transmits to node B. For timeslot 3 and channel 3, node D transmits to node F.

For timeslot 4 and channel 1, node B transmits to node C. For timeslot 4 and channel 2, node D transmits to node E. For timeslot 4 and channel 3, no nodes are transmitting or listening. For timeslot 5 and channel 1, node D transmits to node B. For timeslot 5 and channel 2, node C transmits to node A. For timeslot 5 and channel 3, node E transmits to node F. For timeslot 6 and channel 1, node E transmits to node C. For timeslot 6 and channel 2, node B transmits to node A. For timeslot 6 and channel 3, node F transmits to node D.

In various embodiments, each channel in a frame corresponds to a predetermined transmission frequency, to a pseudo randomly permuted transmission frequency, to a transmission frequency changing according to a predetermined schedule, or to a frequency determined in any other appropriate way.

In some embodiments, a timeslot channel combination in a frame is used to broadcast from a transmitting node to any node that can receive the broadcast. In some embodiments, for a timeslot-channel combination designated to transmit from node 'X' to be received by node 'Y' is also used to acknowledge the receipt of a message by transmitting an acknowledgement message from node 'Y' to be received by node 'X'.

Figure 4:
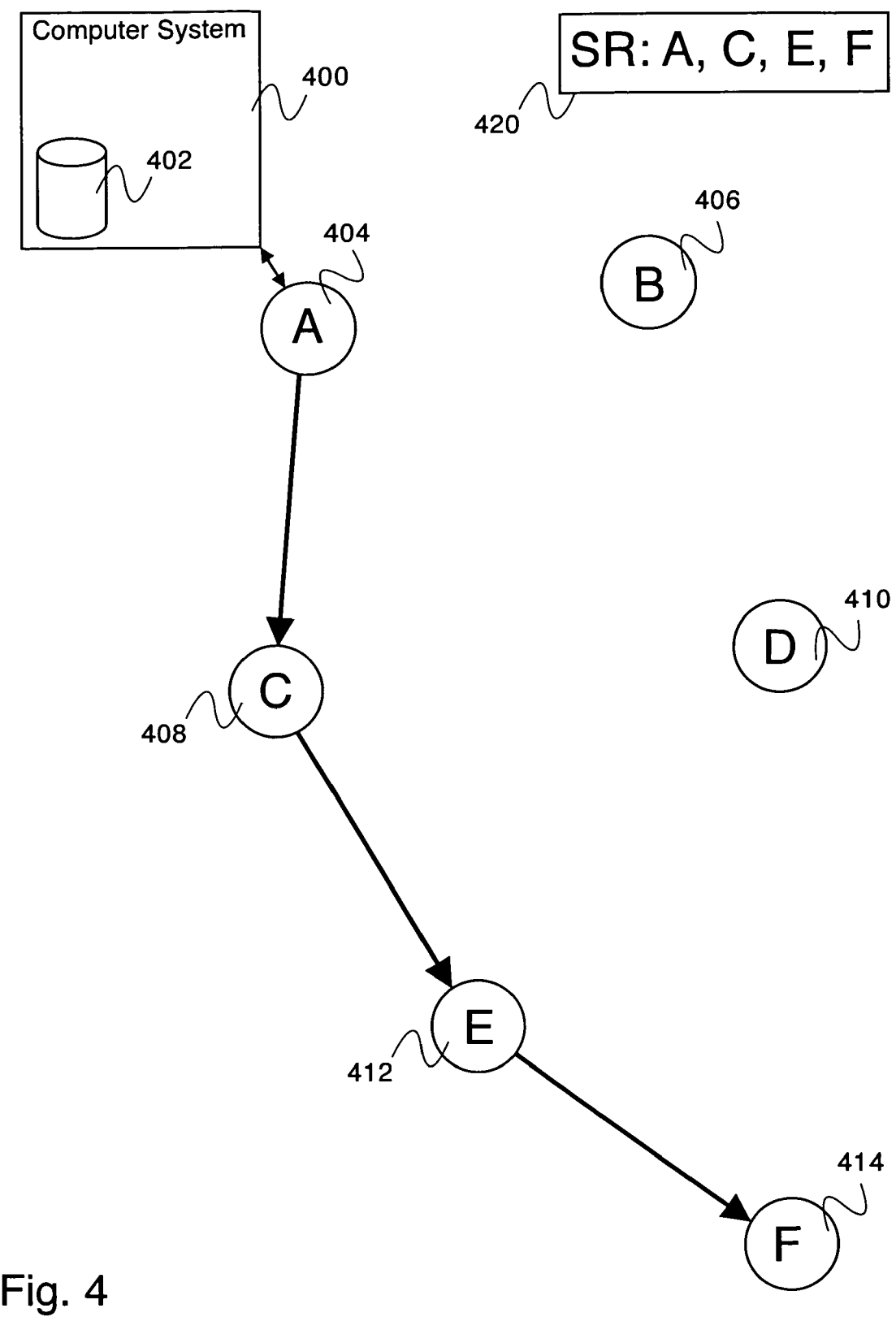
FIG. 4 is a block diagram illustrating an embodiment of a mesh network during processing of a source routed packet.

FIG. 4 is a block diagram illustrating an embodiment of a mesh network during processing of a source routed packet. In some embodiments, the mesh network of FIG. 4 is the mesh network of FIG. 1 during processing of a source routed packet. In some embodiments, the mesh network of FIG. 4 has communications frame 300 of FIG. 3 activated when the source routed packet is sent. In the example shown, a source routed packet is sent from computer system 400 to node 404. The source routed packet comprises source route 420. Source route 420 is an ordered list of nodes along which the source routed packet travels. Following the source route, the source routed packet travels from computer system 400 to node 404, from node 404 to node 408, from node 408 to node 412, and from node 412 to node 414. When the source routed packet is received by a node (e.g., node 404) with an active frame (e.g., frame 300 of FIG. 3) in a given cell (e.g., timeslot 1, channel 2), the node extracts the source route from the packet and determines the next node in the source routed path. The node then transmits the packet to the next node in the source route on the active frame in another cell (e.g., timeslot 3, channel 1). The cell the node transmits the packet in is the next cell in the active frame where the node transmits to the next node in the source route. The packet containing source route 420 is transmitted from node 404 to node 408, from node 408 to node 412, and from node 412 to node 414. In some embodiments, once the node at the end of the source route (e.g., node 414) has received the source routed packet, it transmits an acknowledgement signal, which is forwarded back to computer system 404. Receipt of the acknowledgement signal by the computer system implicitly indicates that the entire source route path was completed successfully.

In some embodiments, a source routed packet is used to activate a predetermined low latency frame. In some embodiments, the predetermined low latency frame is stored in local memory on the node. Included in the source routed packet with the source route is an instruction to activate the new frame. The new frame comprises a set of cells to most directly create a link along the source routed path in order to minimize latency. After a node processes a source routed packet, the new frame is activated. In some embodiments, when the frame is activated, the node switches into high bandwidth mode.

In some embodiments, a source routed packet is used to automatically generate and activate a low latency frame. When a node processes a source routed packet, it adds links to cells in a frame to automatically generate a frame for low latency communication along the source routed path. After a node processes a source routed packet, the new frame is activated. In some embodiments, when the frame is activated, the node switches into high bandwidth mode.

Figure 5:
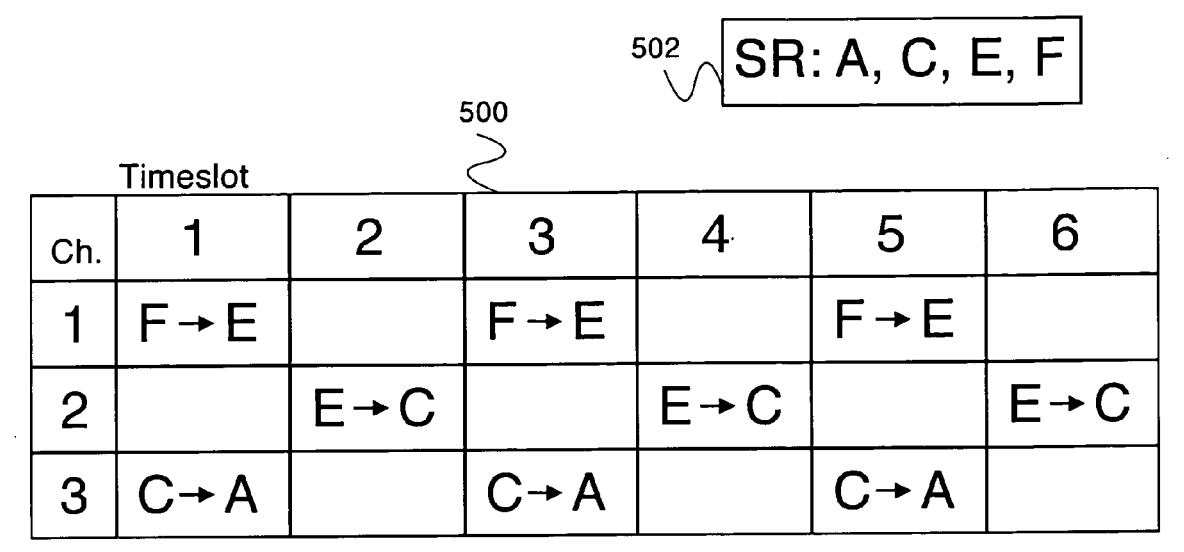

FIG. 5 is a diagram illustrating an embodiment of a low latency frame on a mesh network. In some embodiments, the mesh network comprises the mesh network of FIG. 1. In some embodiments, the low latency frame has been activated by the source routed packet processed in FIG. 4. In the example shown, the source routed packet comprises source route 502. In timeslot 1 on channel 1, node F transmits to node E. In timeslot 1 on channel 3, node C transmits to node A. In timeslot 2 on channel 2, node E transmits to node C. In timeslot 3 on channel 1, node F transmits to node E. In timeslot 3 on channel 3, node C transmits to node A. In timeslot 4 on channel 2, node E transmits to node C. In timeslot 5 on channel 1, node F transmits to node E. In timeslot 5 on channel 3, node C transmits to node A. In timeslot 6 on channel 2, node E transmits to node C. The low latency frame allows transmissions to be made in the opposite direction to the routing of the source routed packet, with low transmission latency. In some embodiments, the low latency frame enables transmissions to be made in the same direction to the routing of the source routed packet with low transmission latency. In some embodiments, once the node processes a source routed packet, it activates a low latency frame. In some embodiments, once a source routed packet reaches the end of the source route, nodes in the source route activate a low latency frame. In some embodiments, after the node activates a low latency frame, it switches into high bandwidth mode. In some embodiments, once the source routed packet reaches the end of the source route, the end node transmits an acknowledgement back to the source of the message.

Figure 6:
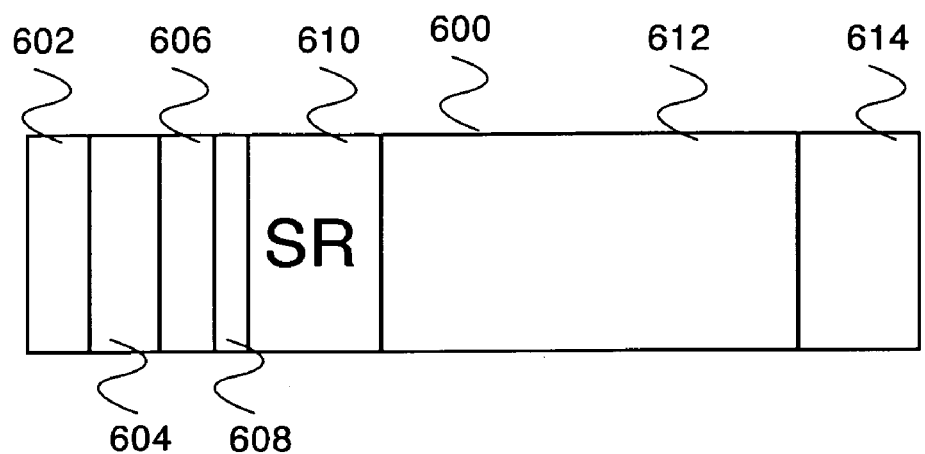
FIG. 6 is a block diagram illustrating an embodiment of a source routed packet.

FIG. 6 is a block diagram illustrating an embodiment of a source routed packet. In the example shown, source routed packet 600 includes preamble 602, start-of-frame delimiter (SFD) 604, packet length 606, source route flag 608, source route 610, payload 612, and checksum 614. Preamble 602 comprises a sequence of bits for synchronizing a clock for reading payload 612. SFD 604 comprises a sequence of bits indicating the start of the information portion of data packet 600. Packet length 606 comprises a series of bits from which the length of payload 612 can be determined. Source route flag 608 comprises a bit that is set to true if packet 600 is a source routed packet, and false if packet 600 is not a source routed packet. Since packet 600 is a source routed packet, source route flag 608 is set to true. Source route 610 comprises an ordered list of nodes that packet 600 is to traverse. Payload 612 comprises the data payload of data packet 600. In various embodiments, payload 612 includes information that is used to determine time of transmission, time of reception, turnaround time, distance or any other appropriate information. Checksum 614 is calculated using a cyclic redundancy check (CRC) operating on payload 612, and is used to determine whether payload 612 has been received without error. In some embodiments, data packet 600 is compliant with Institute of Electrical and Electronics Engineers (IEEE) 802.15.4 standard. Data packet 600 when transmitted from a radio transceiver is transmitted as information encoded in binary form as chips. In various embodiments, chips have a one-to-one correspondence with data bits; data bits are encoded into chips using a chipping sequence; data bits are first encoded into symbols, and the symbols are mapped into a chip sequence, or any other appropriate mapping between chips and data bits.

In various embodiments, a timestamp corresponds to a time associated with a start of a start-of-frame delimiter, an end of a start-of-frame delimiter, a center of a start-of-frame delimiter, a start of a preamble, an end of a preamble, a center of a preamble, a start of a packet length field, an end of a packet length field, a center of a packet length field, a start of a checksum, an end of a checksum, a center of a checksum, a start of a payload byte, an end of a payload byte, a center of a payload byte, a start of a payload bit, an end of a payload bit, or a center of a payload bit, or any other appropriate received data bit, byte, chip, or any other appropriate portion of a packet.

Figure 7:
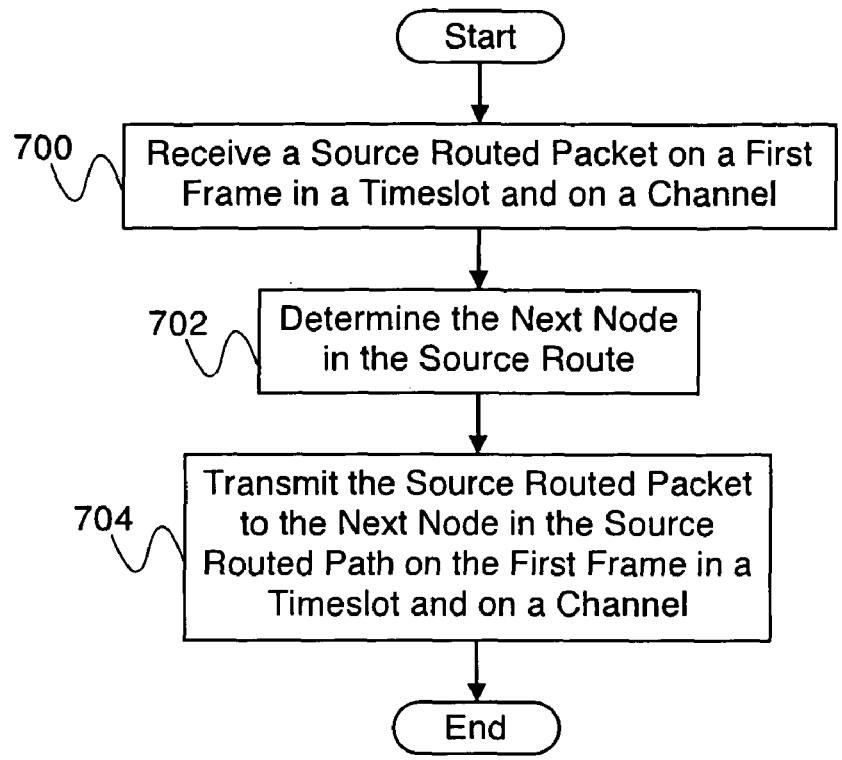
FIG. 7 is a flow diagram illustrating an embodiment of a process for processing a source routed packet.

FIG. 7 is a flow diagram illustrating an embodiment of a process for processing a source routed packet. In some embodiments, the process of FIG. 7 is used by a node (e.g. node 200 of FIG. 2) for processing a source routed packet (e.g. packet 600 of FIG. 6) in a mesh network (e.g., the mesh network of FIG. 1). In the example shown, in 700, a source routed packet is received by the node in a timeslot and on a channel, as specified by the first frame (e.g., frame 300 of FIG. 3). In 702, the node determines the next node in the source route. In some embodiments, the source route is specified in the source routed packet. In some embodiments, the source route is specified using an ordered list of nodes. In some embodiments, determining the next node in the source route comprises traversing the ordered list of nodes in the source route (e.g., source route 610 of FIG. 6) until the current node is found and then determining that the next node in the source route comprises the next node in the ordered list of nodes. In some embodiments, if the name of the current node is not found in the source route, the packet is discarded and the process ends. In 704, the source routed packet is transmitted to the next node in the source routed path using a timeslot and a channel as specified by a first frame, and the process ends. In some embodiments, the node activates a second frame, wherein the second frame has a lower latency for communicating messages in the mesh network than the first frame. In some embodiments, the node switches to using the second frame enabling communication in a high bandwidth mode.

Figure 8:
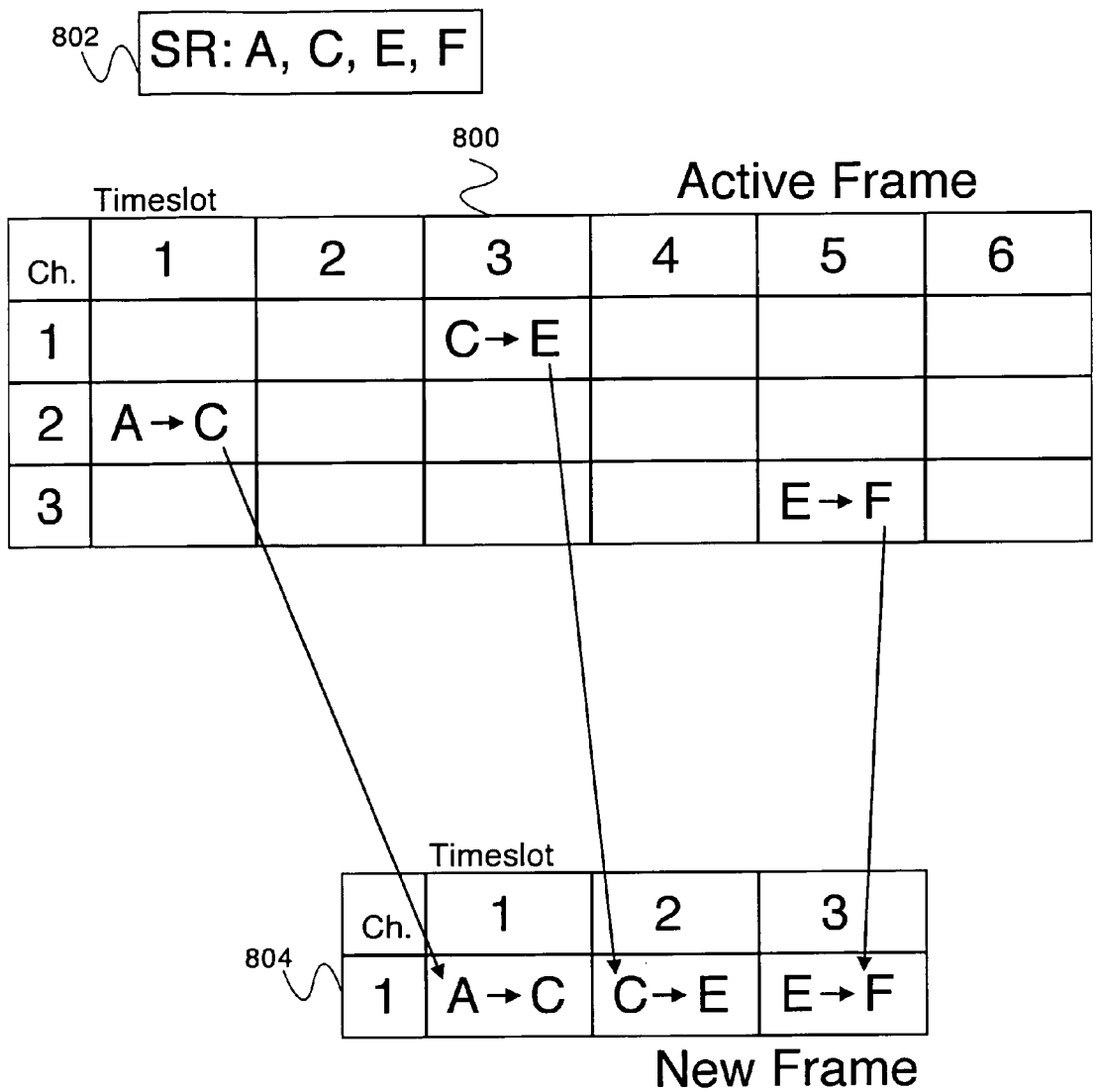
FIG. 8 is a diagram illustrating an embodiment of automatic creation of a low-latency frame during processing of a source routed packet.

FIG. 8 is a diagram illustrating an embodiment of automatic creation of a low latency frame during processing of a source routed packet. In some embodiments, the mesh network is the mesh network of FIG. 1. In some embodiments, active frame 800 comprises frame 300 of FIG. 3. In some embodiments, the source routed packet comprises the source routed packet processed in FIG. 4. In the example shown, the source routed packet comprises source route 802. In timeslot 1 on channel 2, the source routed packet is transmitted from node A to node C. After node C receives the source routed packet, it traverses source route 802 to determine its position in the source route and what node is next in the source route. It then adds the link it received the packet from (e.g., A→C) to new frame 804, in timeslot N−1, where N is node C's position in the source route (e.g., N is 2, so it adds the link to timeslot 1). After updating new frame 804, it transmits the packet to the next node in the source route in the appropriate cell of active frame 800. In timeslot 3 on channel 1, the source routed packet is transmitted from node C to node E. Node E then adds the link C→E to new frame 804 at timeslot 2. In timeslot 5 on channel 3, the source routed packet is transmitted from node E to node F. Node F then adds the link E→F to new frame 804 at timeslot 3. The source routed packet has then reached the end of the source route, and automatic construction of new frame 804 is complete. No other transmissions are used in the source route, so transmissions in all other cells in the frame are ignored. In some embodiments, after a node processes the source routed packet, it activates new frame 804. In some embodiments, the length of the new frame 804 is equal to the number of transmissions in source route 802, a different length specified in the packet (e.g., payload 612 of FIG. 6), or any other appropriate pre-defined length stored on the nodes. For example, a 16-slot frame that only goes 3 hops is created for reasons of having a low power usage for the nodes or to preserve non-collision properties with other frames. In some embodiments, once the source routed packet reaches the end of the source route, nodes in the source route activate new frame 804. In some embodiments, nodes create both the new frame 804 in addition to a corresponding frame linking the same ordered list of nodes in the opposite direction. For example, a node automatically creates both a low-latency "downstream" frame (e.g., going from A→C→E→F) and a low-latency "upstream" frame (e.g., going from F→E→C→A) using a single packet. In some embodiments, once new frame 804 is activated the node switches into high bandwidth mode. In some embodiments, once the source routed packet reaches the end of the source route, the end node transmits an acknowledgement.

In some embodiments, a node stores in its memory only the links of a frame relevant to it (e.g., when it is transmitting or receiving). In some embodiments, a node stores in its memory only the links in the automatically created frame relevant to it (e.g., when it is transmitting or receiving).

Figure 9:
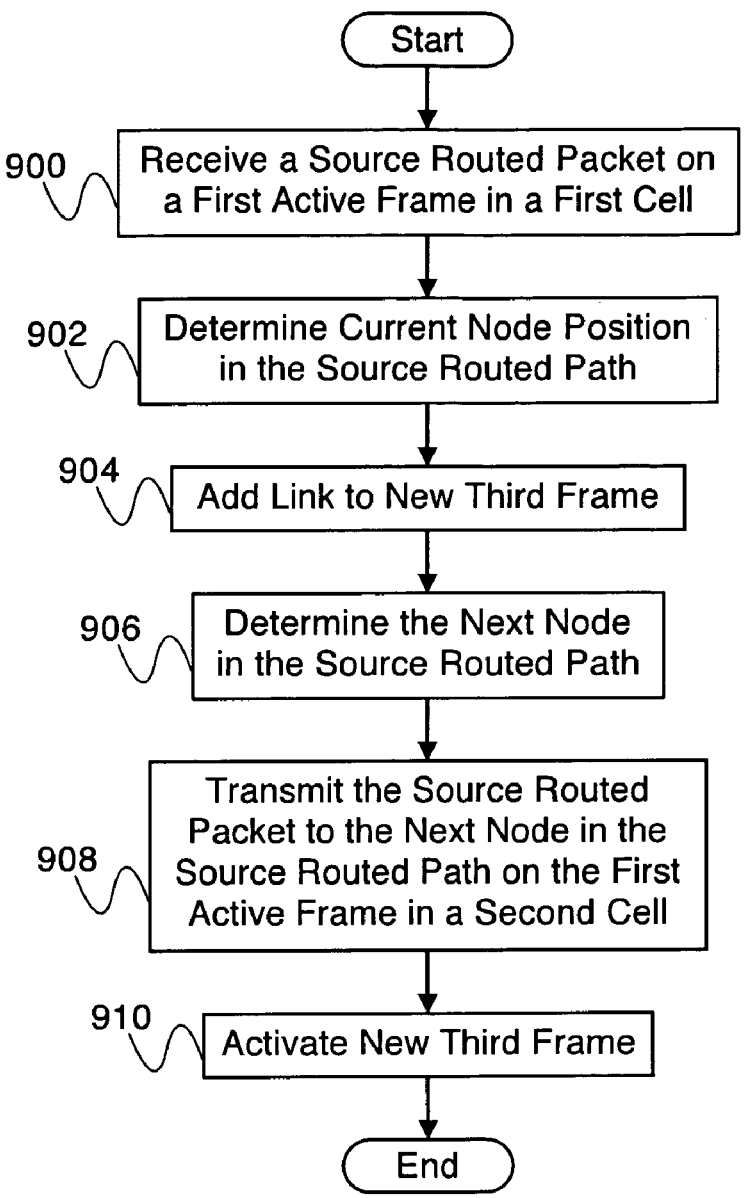
FIG. 9 is a flow diagram illustrating an embodiment of a process for processing a source routed packet and automatically creating a low latency frame.

FIG. 9 is a flow diagram illustrating an embodiment of a process for processing a source routed packet and automatically creating a low latency frame. In some embodiments, the process of FIG. 9 is used by a node (e.g., node 200 of FIG. 2) for processing a source routed packet (e.g., packet 600 of FIG. 6) and automatically generating a low latency frame (e.g., frame 804 of FIG. 8). In the example shown, in 900, a source routed packet is received by the node on a first active frame (e.g., frame 300 of FIG. 3) in a first cell (e.g., timeslot 3, channel 2). In 902, the node determines the current node position in the source routed path. In some embodiments, determining the current node position in the source routed path comprises traversing the list of nodes in the source route (e.g., source route 610 of FIG. 6) while keeping track of the index into the list of each node, and recording the index into the list when the current node is found. In 904, a link is added to a new third frame, wherein the frame has a lower latency for communicating messages in the mesh network than the first frame. In some embodiments, the link corresponds to the link over which the current node received the source routed packet. In some embodiments, the link is added to the third frame at a timeslot corresponding to the index of the current node into the source route minus one. In 906, the node determines the next node in the source routed path. In some embodiments, determining the next node in the source routed path comprises traversing the list of nodes in the source route until the name of the current node is found and then finding the name of the next node in the list of nodes in the source route. In some embodiments, if the name of the current node is not found in the source route, the packet is discarded and the process ends. In 908, the source routed packet is transmitted to the next node in the source routed path on the first active frame in a second cell. In 910, the node activates the third frame, and the process ends. In some embodiments, the third frame is activated after the source routed packet reaches the end of the source route. In some embodiments, the node switches to using the third frame enabling communication in a high bandwidth mode.

Figure 10:
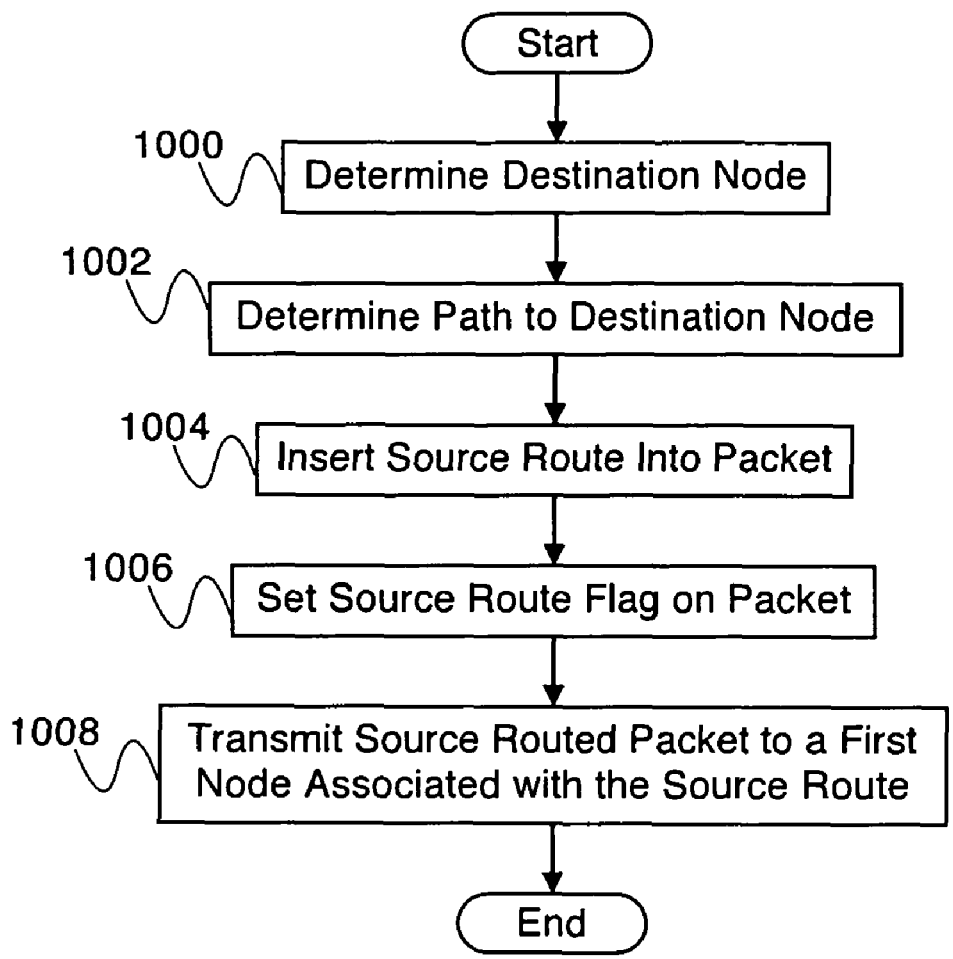
FIG. 10 is a flow diagram illustrating an embodiment of a process for creating a source routed packet.

FIG. 10 is a flow diagram illustrating an embodiment of a process for creating a source routed packet. In some embodiments, the source routed packet is source routed packet 600 of FIG. 6. In various embodiments, the source routed packet is created by a node (e.g., node 200 of FIG. 2), by a computer system (e.g., computer system 100 of FIG. 1), or by any other appropriate system. In the example shown, in 1000, the destination node is determined. The destination node can be any node accessible via any number of intermediate nodes from the system creating the source routed packet. In 1002, the path to the destination node is determined. In some embodiments, determining a source route path comprises determining a route with one or more of the following: a path length that meets a path length criteria within a mesh network or a number of hops that meets a number of hops criteria within a mesh network. In various embodiments, determining a source route path includes determining a path wherein a node associated the path has an average uptime that meets an uptime criteria, an average node latency that meets a node latency criteria, an average node bandwidth that meets a node bandwidth criteria, a battery level that meets a battery level criteria, an average node error rate that meets a node error rate criteria, or determining a path according to any other appropriate criteria. In various embodiments, a greedy algorithm, a divide and conquer algorithm, a dynamic programming algorithm, or any other appropriate algorithm may be used to determine the path. In 1004, the source route is inserted into the packet (e.g., as source route 610 of FIG. 6). In various embodiments, the source route is inserted as plaintext or is encrypted, encoded, compressed, or transformed in any other appropriate way. In some embodiments, the source route is constrained by a maximum source route length. If the source route is greater than the maximum source route length, the source route is truncated to be less than or equal to the maximum source route length, and the remaining steps in the source route are replaced by a broadcast routing instruction. In 1006, the source route flag on the packet is set to true. In 1008, the source routed packet, including the source route path, is transmitted to a first node associated with the source route path and the process ends.

Figure 11:
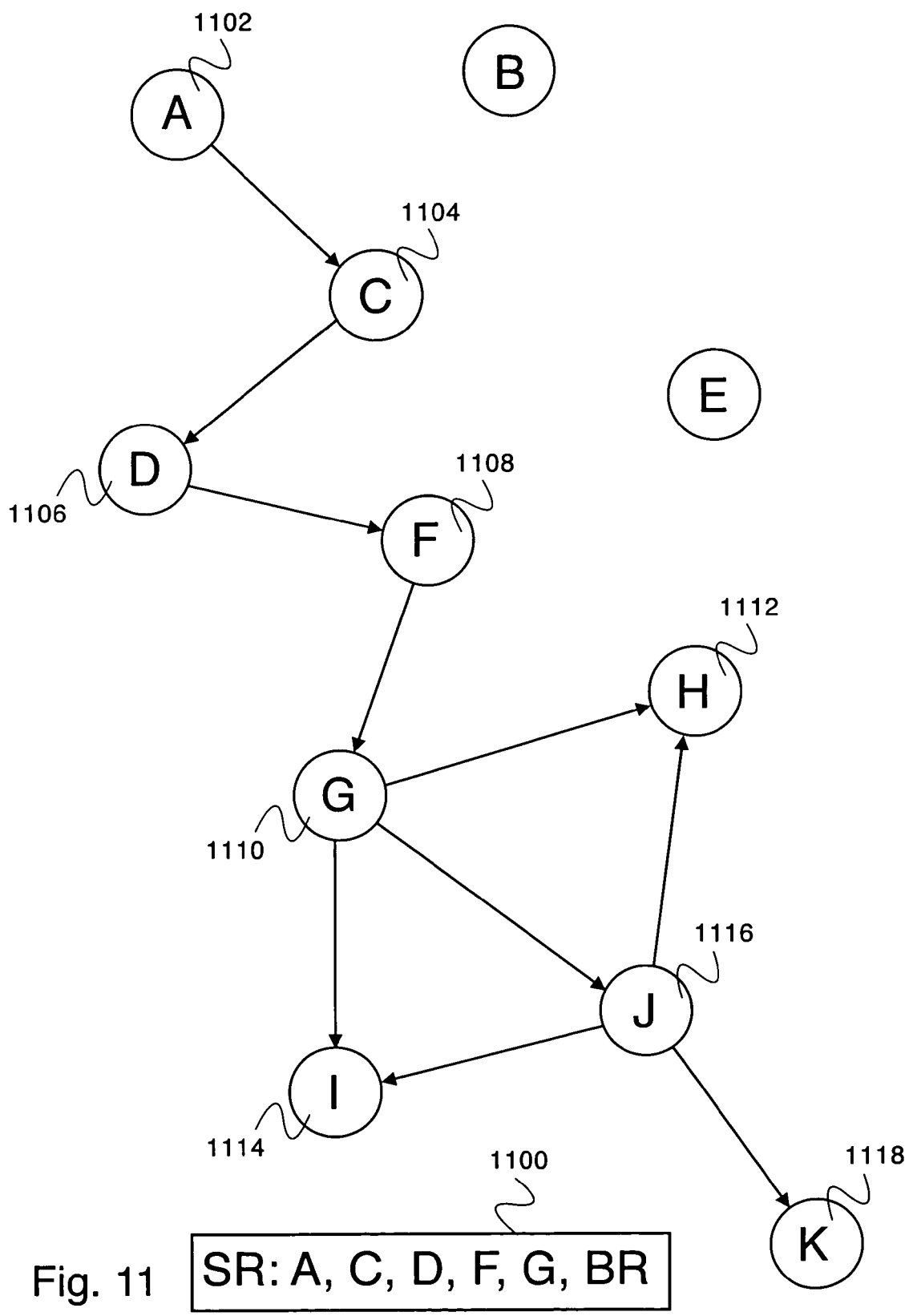
FIG. 11 is a block diagram illustrating an embodiment of a mesh network during processing of a partially source routed packet.

FIG. 11 is a block diagram illustrating an embodiment of a mesh network during processing of a partially source routed packet. In some embodiments, the mesh network is the mesh network of FIG. 1. In some embodiments, the partially source routed packet is the source routed packet 600 of FIG. 6. The partially source routed packet includes source route 1100, comprising a list of nodes along which to route the packet. In some embodiments, the number of nodes in the list in the source route is constrained by a maximum number of nodes. In the example shown, the maximum number of nodes in the source route is 5. If the path from the system sending the source routed packet to the final destination node has more links than the maximum number of nodes in the source route, the source route is included in the packet up to the maximum number of nodes, followed by an instruction that the packet is to be broadcast routed the rest of the way. In the example shown, source route 1100 comprises the source route A, C, D, F, G, followed by an instruction to broadcast route the packet. In this way, a subset of nodes can be broadcast to—for example, a portion of machinery, a room, a set of actuators or sensors can all receive a similar message (e.g., turn on the lights of a group or rooms, turn off machinery in one section of a plant, etc.). The packet is processed as a source routed packet and transmitted from node 1102 to node 1104, to node 1106, to node 1108, to node 1110. The source route has then been exhausted, so the packet is broadcast routed. In the event that the next node in the source route includes the instruction to broadcast the source routed packet, the source routed packet is broadcast within the frame. Node 1110 transmits the packet to every node it has the opportunity to, and it is received by node 1112, node 1114, and node 1116. Node 1116 transmits the packet to every node it has the opportunity to, and it is received by node 1114, node 1112, and node 1118. The packet has then reached the end of the desired route, so the transmission stops. In some embodiments, the destination node sends an acknowledgement after it has received the packet.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a source routed packet, comprising:

receiving a source routed packet at a first node in a mesh network in a timeslot and on a channel as specified by a first communications schedule for the mesh network, wherein the first communications schedule comprises a set of a plurality of timeslots and a plurality of channels, wherein a combination of one of the plurality of timeslots and one of the plurality of channels comprises a slot able to specify a communication link between two nodes, wherein the first communications schedule includes a plurality of channels associated with one timeslot of the plurality of timeslots that are able to specify links that communicate at the same time on multiple channels, wherein the source routed packet includes a source route comprising an ordered list of nodes;

determining a position of the first node in the source route based at least in part on the ordered list of nodes;

determining a previous node in the source route based at least in part on the ordered list of nodes;

determining whether a next node exists;

in the event that a next node does exist:
determining a next node in the source route based at least in part on the ordered list of nodes;
transmitting the source routed packet to the next node in the mesh network in a timeslot and on a channel as specified by the first communications schedule; and
activating a second communications schedule on the first node, wherein the second communications schedule for the mesh network includes a combination of a timeslot and a channel specifying a communication link to the next node, based at least in part on the position of the first node in the source route, and based at least in part on an instruction in the source routed packet;

in the event that a next node does not exist:
determining an originating node of the source route based at least in part on the ordered list of nodes;
transmitting an acknowledgment packet to the originating node; and
activating a third communications schedule on the first node, wherein the third communications schedule for the mesh network includes a combination of a timeslot and a channel specifying a communication link to the previous node, based at least in part on the position of the first node in the source route, and based at least in part on the instruction in the source routed packet.

2. A system for processing a source routed packet, comprising:
   a receiver for receiving a source routed packet at a first node in a mesh network in a timeslot and on a channel as specified by a first communications schedule for the mesh network, wherein the first communications schedule comprises a set of a plurality of timeslots and a plurality of channels, wherein a combination of one of the plurality of timeslots and one of the plurality of channels comprises a slot able to specify a communication link between two nodes, wherein the first communications schedule includes a plurality of channels associated with one timeslot of the plurality of timeslots that are able to specify links that communicate at the same time on multiple channels, wherein the source routed packet includes a source route comprising an ordered list of nodes;
   a processor for determining a position of the first node, a next node, a previous node, and an originating node in the source route based at least in part on the ordered list of nodes;
   an activator for activating a second communications schedule or a third communications schedule on the first node, wherein the second communications schedule for the mesh network includes a combination of a timeslot and a channel specifying a communication link to the next node, wherein the third communications schedule for the mesh network includes a combination of a timeslot and a channel specifying a communication link to the previous node, and wherein a time for activating is based at least in part on an instruction comprised in the source routed packet;
   a transmitter for transmitting the source routed packet to the next node in the mesh network in a timeslot and on a channel as specified by the first communications schedule in the event that a next node does exist, and for transmitting an acknowledgment packet to the originating node in the event that a next node does not exist.

3. A system as in claim 2, wherein determining the next node in the source route comprises:
   traversing the ordered list of nodes in the source route until the first node is found; and
   determining that the next node in the source route comprises the next node in the ordered list of nodes.

4. A system as in claim 2, wherein the second communications schedule has a lower latency for communicating messages in the mesh network than the first communications schedule.

5. A system as in claim 4, further comprising switching to using the second communications schedule enabling communication in a high bandwidth mode.

6. A system as in claim 2, wherein determining the previous node in the source route comprises:
   traversing the ordered list of nodes in the source route until the first node is found; and
   determining that the previous node in the source route comprises the previous node in the ordered list of nodes.

7. A system as in claim 2, wherein determining the originating node in the source route comprises identifying a source node in the ordered list of nodes.

8. A system as in claim 2, wherein the link to the next node in the second communications schedule on the first communications schedule is deactivated.

9. A system as in claim 2, wherein the link to the previous node in the second communications schedule on the first communications schedule is deactivated.

10. A computer program product for processing a source routed packet, the computer program product being embodied in a computer readable non-transitory storage medium and comprising computer instructions for:
    receiving a source routed packet at a first node in a mesh network in a timeslot and on a channel as specified by a first communications schedule for the mesh network, wherein the first communications schedule comprises a set of a plurality of timeslots and a plurality of channels, wherein a combination of one of the plurality of timeslots and one of the plurality of channels comprises a slot able to specify a communication link between two nodes, wherein the first communications schedule includes a plurality of channels associated with one timeslot of the plurality of timeslots that are able to specify links that communicate at the same time on multiple channels, wherein the source routed packet includes a source route comprising an ordered list of nodes;
    determining a position of the first node in the source route based at least in part on the ordered list of nodes;
    determining a previous node in the source route based at least in part on the ordered list of nodes;
    determining whether a next node exists;
    in the event that a next node does exist:
        determining a next node in the source route based at least in part on the ordered list of nodes;
        transmitting the source routed packet to the next node in the mesh network in a timeslot and on a channel as specified by the first communications schedule; and
        activating a second frame communications schedule on the first node, wherein the second communications schedule for the mesh network includes a combination of a timeslot and a channel specifying a communication link to the next node, based at least in part on the position of the first node in the source route, and based at least in part on an instruction in the source routed packet;
    in the event that a next node does not exist:
        determining an originating node of the source route based at least in part on the ordered list of nodes;
        transmitting an acknowledgment packet to the originating node; and
        activating a third communications schedule on the first node, wherein the third communications schedule for the mesh network includes a combination of a timeslot and a channel specifying a communication link to the previous node, based at least in part on the position of the first node in the source route, and based at least in part on the instruction in the source routed packet.

11. A method for activating bandwidth between a source node and a destination node in a mesh network, comprising:
    determining a source route path to a destination node, wherein the source route path comprises an ordered list of nodes; and
    transmitting a source routed packet that includes the source route path to a first node associated with the source route path, wherein the source routed packet includes an instruction for activating a first communications schedule for the mesh network, and wherein the first communications schedule comprises a plurality of timeslots and a plurality of channels, wherein a combination of one of the plurality of timeslots and one of the plurality of channels comprises a slot able to specify a communication link between two nodes, wherein the first communications schedule includes a plurality of channels associated with one timeslot of the plurality of timeslots that are able to specify links that communicate at the same time on multiple channels;
wherein the source routed packet causes:
a position of the first node to be determined based at least in part on the ordered list of nodes;
a previous node in the source route path to be determined based at least in part on the ordered list of nodes;
existence of a next node to be determined;
in the event that a next node does exist:
a next node in the source route path to be determined based at least in part on the ordered list of nodes;
the source routed packet to be transmitted to the next node in the mesh network in a timeslot and on a channel as specified by the first communications schedule;
a second communication link to the next node to be added to a second communications schedule on the first node based at least in part on the position of the first node in the source route path, wherein the second communications schedule for the mesh network includes a combination of a timeslot and a channel specifying the second communication link; and
the second communications schedule on the first node to be activated;
in the event that a next node does not exist:
an originating node of the source route path to be determined based at least in part on the ordered list of nodes;
an acknowledgment packet to be transmitted to the originating node;
a third communication link to the previous node to be added to a third communications schedule on the first node based at least in part on the position of the first node in the source route path, wherein the third communications schedule for the mesh network includes a combination of a timeslot and a channel specifying the third communication link; and
the third communications schedule on the first node to be activated.

12. A system for activating bandwidth between a source node and a destination node in a mesh network, comprising:
a determiner for determining a source route path to a destination node, wherein the source route path comprises an ordered list of nodes;
a transmitter for transmitting a source routed packet that includes the source route path to a first node associated with the source route path, wherein the source routed packet includes an instruction for activating a first communications schedule for the mesh network, and wherein the first communications schedule comprises a plurality of timeslots and a plurality of channels, wherein a combination of one of the plurality of timeslots and one of the plurality of channels comprises a slot able to specify a communication link between two nodes, wherein the first communications schedule includes a plurality of channels associated with one timeslot of the plurality of timeslots that are able to specify links that communicate at the same time on multiple channels;
wherein the source routed packet causes:
a position of the first node to be determined based at least in part on the ordered list of nodes;
a previous node in the source route path to be determined based at least in part on the ordered list of nodes;
existence of a next node to be determined;
in the event that a next node does exist:
a next node in the source route path to be determined based at least in part on the ordered list of nodes;
the source routed packet to be transmitted to the next node in the mesh network in a timeslot and on a channel as specified by the first communications schedule;
a second communication link to the next node to be added to a second communications schedule on the first node based at least in part on the position of the first node in the source route path, wherein the second communications schedule for the mesh network includes a combination of a timeslot and a channel specifying the second communication link; and
the second communications schedule on the first node to be activated;
in the event that a next node does not exist:
an originating node of the source route path to be determined based at least in part on the ordered list of nodes;
an acknowledgment packet to be transmitted to the originating node;
a third communication link to the previous node to be added to a third communications schedule on the first node based at least in part on the position of the first node in the source route path, wherein the third communications schedule for the mesh network includes a combination of a timeslot and a channel specifying the third communication link; and
the third communications schedule on the first node to be activated.

13. A system as in claim 12, wherein determining a source route path includes determining a route with one or more of the following:
a path length that meets a path length criteria within a mesh network, a number of hops that meets a number of hops criteria within a mesh network.

14. A system as in claim 12, wherein determining a source route path includes determining a path wherein a node associated the path has an average uptime that meets an uptime criteria, an average node latency that meets a node latency criteria, an average node bandwidth that meets a node bandwidth criteria, a battery level that meets a battery level criteria, or an average node error rate that meets a node error rate criteria.

15. A system as in claim 12, wherein the source routed packet includes a source route flag.

16. A system as in claim 12, wherein the first node is included in a plurality of nodes.

17. A system as in claim 16, wherein the plurality of nodes comprises nodes specified by the source route path.

18. A system as in claim 16, wherein the plurality of nodes comprises nodes not specified by the source route path.

19. A system as in claim 12, wherein the added link is added based at least in part on a formula, wherein the formula is based at least in part on the position of the first node in the source route path.

20. A computer program product for activating bandwidth between a source node and a destination node in a mesh network, the computer program product being embodied in a computer readable non-transitory storage medium and comprising computer instructions for:

determining a source route path to a destination node, wherein the source route path comprises an ordered list of nodes; and transmitting a source routed packet that includes the source route path to a first node associated with the source route path, wherein the source routed packet includes an instruction for activating a first communications schedule for the mesh network, wherein the first communications schedule comprises a plurality of timeslots and a plurality of channels, wherein a combination of one of the plurality of timeslots and one of the plurality of channels comprises a slot able to specify a communication link between two nodes, wherein the first communications schedule includes a plurality of channels associated with one timeslot of the plurality of timeslots that are able to specify links that communicate at the same time on multiple channels;

wherein the source routed packet causes:
- a position of the first node to be determined based at least in part on the ordered list of nodes;
- a previous node in the source route path to be determined based at least in part on the ordered list of nodes;
- existence of a next node to be determined;
- in the event that a next node does exist:
  - a next node in the source route path to be determined based at least in part on the ordered list of nodes;
  - the source routed packet to be transmitted to the next node in the mesh network in a timeslot and on a channel as specified by the first communications schedule;
  - a second communication link to the next node to be added to a second communications schedule on the first node based at least in part on the position of the first node in the source route path, wherein the second communications schedule for the mesh network includes a combination of a timeslot and a channel specifying the second communication link; and
  - the second frame communications schedule on the first node to be activated;
- in the event that a next node does not exist:
  - an originating node of the source route path to be determined based at least in part on the ordered list of nodes;
  - an acknowledgment packet to be transmitted to the originating node;
  - a third communication link to the previous node to be added to a third communications schedule on the first node based at least in part on the position of the first node in the source route path, wherein the third communications schedule for the mesh network includes a combination of a timeslot and a channel specifying the third communication link; and
  - the third frame communications schedule on the first node to be activated.

* * * * *